Jan. 26, 1971 F. L. BAIER ET AL 3,558,290
PLATED PLASTIC PRINTING PLATES
Filed April 2, 1968
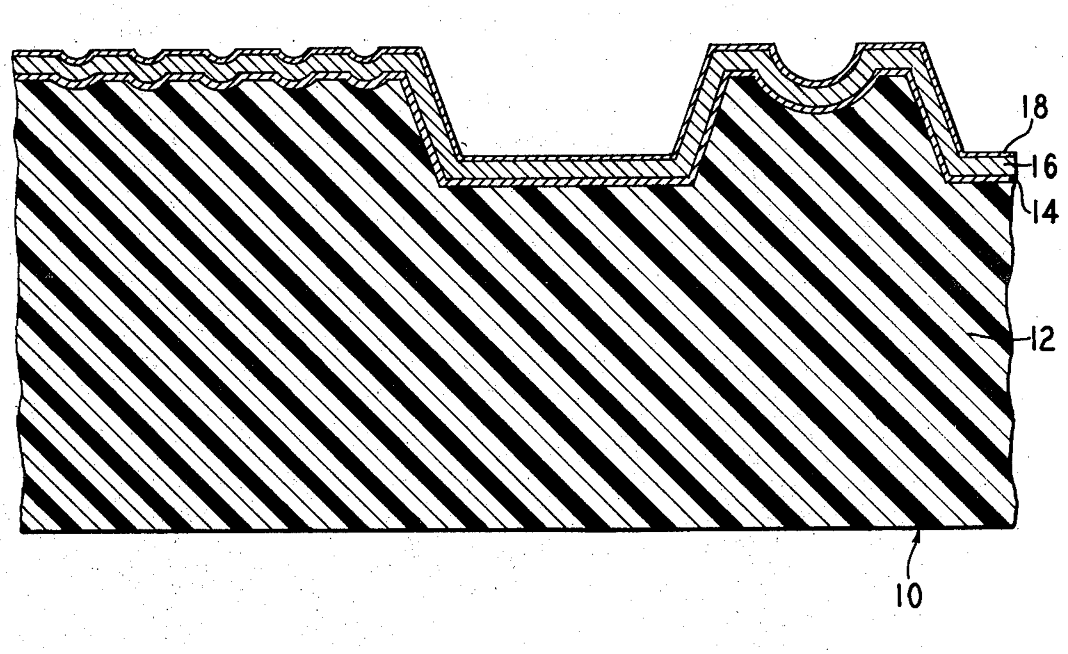
INVENTORS
FREDERICK L. BAIER
JOHN B. WHEELER, III
BY Thomas C. Stover Jr.
ATTORNEY

1

2

3,558,290

PLATED PLASTIC PRINTING PLATES

Frederick L. Baier, High Bridge, and John B. Wheeler III, Somerville, N.J., assignors to Union Carbide Corporation, a corporation of New York Filed Apr. 2, 1968, Ser. No. 718,112
Int. Cl. B32b *15/08*
U.S. Cl. 29—195 6 Claims

ABSTRACT OF THE DISCLOSURE

A metal-plated plastic printing plate is provided which is a considerable improvement in durability over conventional plastic printing plates, and their predecessors, the lead stereotypes and zinc originals.

FIELD OF THE INVENTION

This invention relates to an improvement over plastic printing plates. More particularly, this invention relates to metal-plated plastic printing plates.

THE PRIOR ART

Plastic printing plates for newspapers, magazines, books and the like, have been developed which have markedly outpaced their predecessors, the zinc wrap-around etchings and lead stereotypes, in clarity and durability. For example, in newspaper printing the plastic plate has been capable of running 125,000 or more impressions on a rotary newspaper letter press where the lead or zinc plates typically wear out at half that number.

Recently, methods have been discovered for plating plastics with metal coatings, having peel strengths of up to 5 pounds per inch or more. Patent applications, Ser. Nos. 528,389 now abondoned; 533,269; and 536,986, for examples, give detailed processes for plating plastic substrates.

Not all plastics which can be plated are suitable as printing plates. Thus, while ABS (acrylonitrile/butadiene/styrene), is readily plateable with various metal coatings, it forms brittle printing plates which lack flexibility and durability. Even when metal plated, these plastic plates, when conventionally tension mounted in a printing press, e.g., by tension hooks which engage slots in the plate, tend to flex and fatigue, i.e., split and fragment between 20,000 to 100,000 impressions. For example, a metal-plated ABS printing plate tends to fatigue after only about 30,000 impressions. The above resins have a tensile modulus of elasticity of 300,000 p.s.i. or more as measured by ASTM test D638–64T at 23° C.

While the plastic plate employed should not be too rigid and brittle as indicated above, it should also not be too flexible or elastic so as to become loosely mounted or otherwise distort under the tension applied. Thus, plastic plates having a tensile modulus of elasticity of less than 50,000 p.s.i. as measured by ASTM test D638–64T at 23° C., will generally not maintain their shape to close tolerances under the tensions of about 200 to 700 p.s.i. generally applied to a plate in tension mounting thereof. Examples of such low modulus materials are ethylene vinyl acetate, ethylene ethyl acrylate, ethylene acrylic acid, rubber materials and the like.

Of course, plates of the above materials can be protected from the stresses of flexing or from distortion by form-fitting and gluing them to a printing press. However, this mounting method has not found favor in the letterpress printing industry because of the extensive installation time required and due to difficulties in relocating or shifting the plates after installation thereof and difficulties in removing such plates after their use.

It has now been found that certain polymeric materials, when metal plated, form a highly durable and clear printing plate, plates which neither fatigue nor distort and are highly suitable for tension mounting in a press, or other mounting methods, including, if desired, adhesion mounting. The development of such metal-coated printing plates extends the usefulness of the plastic printing plate system into much longer run work, such as, for examples, into the Sunday comics field in newspapers, into the mass circulation magazine printing field and into long run commercial printing, where plastic printing plates have previously been unable to compete with the metal plates employed. Depending upon the type of metal coating employed, the metal-coated printing plates can withstand from over 500,000 impressions to over 2,000,000 or more such impressions before wear renders the reproduction unacceptable.

SUMMARY

Broadly, the printing plate of the invention comprises a flexible plastic printing plate having a tensile modulus of elasticity of from 50,000 p.s.i. to 250,000 p.s.i. as measured by ASTM test D638–64T at 23° C., plated with a wear-resistant coating of one or more metal components.

DESCRIPTION

The invention will become more apparent from the following detailed specification and drawing in which:

The figure is a sectional elevational view of a plated plastic plate embodying the invention.

Referring now to the drawing, plated printing plate 10 includes polypropylene plate 12 coated successively with a conductive layer of electroless nickel 14, a layer of electroplated nickel 16 and a layer of electroplated chromium 18 as shown in the figure.

The polymeric materials suitable for the plated plate of the present invention are those materials having a tensile modulus of elasticity of from 50,000 to 250,000 p.s.i. and a preferred range between 100,000 and 200,000 p.s.i., as measured by ASTM test D638–64T at 23° C. and include such thermoplastics as the polyamides, the polyolefins, for example, polyethylene, polypropylene, poly(butene-1), polychlorotrifluoroethylene, thermoplastic polyesters such as polyethyleneterephthlate and copolymers thereof, as well as thermoset plastics of the above flexibility including polyesters, epoxy compounds, polyurethanes, and copolymers thereof. A preferred material is polypropylene.

The metals suitable for plating a plastic printing plate of the above materials include electrodeposited coatings such as nickel, iron, copper and chromium and alloys such as cobalt-nickel, tin-nickel and copper-tin alloys. These coatings can also contain dispersed, hard particles therein including metal particles such as nickel powder or non-metal particles such as silicon particles, silicon carbide particles and the like to impart abrasion resistance where desired. Although one layer of a metal coating is feasible, e.g., an electroless layer of nickel or copper; at least two layers, an electroless metal layer surmounted by an electroplated metal layer, are preferred. Examples of such two layer coatings are, nickel plated on nickel or copper, copper plated on copper or nickel, and chromium plated on nickel or copper. The plastic plate can also be coated with three metal layers, as exemplified in the figure or more layers as desired. For examples, any of the above two-layer coatings can be plated with chromium, copper or nickel layers. Preferred metal coatings of those given above are nickel plated nickel or, as shown in the figure, chromium on nickel plated nickel.

As indicated above, nickel can be used by itself, as a base for chromium, or as a layer surmounting a copper base. Normally, if a single layer is used, it is an electroless nickel layer. Chromium is usually plated over one or more metal sublayers, e.g. copper or nickel and the like. Range of overall metal thicknesses is from 0.01 mil, about the minimum to obtain significant wear protection, up to about 1.0 mil. Thicker layers distort the dimensions of halftone dots excessively. The electroless layer should have a thickness to afford sufficient conductivity to carry the current required to deposit subsequent metal layers. The preferred overall range is from 0.1 mil to 0.5 mil. The preferred thicknesses for two or three metal coatings are: electroless layer, .05–.1 mil, plated layer, 0.4 mil, and second plated layer, 0.05 mil.

How the above metals are coated on the above-listed plastic plates is not critical. Any feasible coating method will suffice including the methods detailed in the above-listed copending applications.

Thus, for example, plates of the above polymeric materials can be coated as outlined below. In this method the plastic plate is treated with a class of low molecular weight compounds referred to as "latent adhesion promoters," which when employed in concentration of about two percent or less of the total polymer, provide adhesion values with metal platings of 5 pounds per inch of peel strength or more.

The latent adhesion promoters are low molecular weight organic compounds having a minimum oxidation rate at least about twenty times greater than the oxidation rate of stearic acid and preferably at least about fifty times greater than the oxidation rate of stearic acid. The relative oxidation rates can be readily determined by methods such as that described by A. J. Stirton et al. in "Oil and Soap," 22, pages 81–83 (1945). The molecular weight of the adhesion promoters can range up to about 2000 and preferably is between 100 and 2000. Their effect on the metal-to-polymer adhesion is "latent" in that it is potentiated or developed only after an oxidation treatment as hereinafter described.

Examples of typical latent adhesion promoters are low molecular weight organic compounds such as the highly unsaturated fatty acids, e.g., sorbic acid, linoleic acid, linolenic acid, elaeostearic acid and liconic acid and their esters, amides and imides together with the amides and imides of monounsaturated fatty acids such as oleic and ricinoleic acid; highly unsaturated aliphatic hydrocarbons such as squalene; highly unsaturated alicyclic compounds such as abietic acid; aliphatic polyethers such as polyethylene glycol, polypropylene glycol as well as their adducts and esters, as for example the poly(ethylene oxide) adducts of nonyl phenyl; tertiary aliphatic compounds such as isobutyric and isovaleric acid and the esters, amides and imides thereof and aliphatic substituted aromatic compounds containing at least one benzylic hydrogen such as cumene, thymol and their derivatives. It has also been found possible to employ such compounds in more or less natural or crude form, for example, even by direct use of such products as linseed oil, tung oil, tall oil, wood rosin, the terpenes including dipentene, terpentene emulsions, and the like.

These organic compounds have proven effective as adhesion promoters whether incorporated into the polymer through compounding, immersion impregnating, dipping, spraying or other means for imparting the adhesion promoter into at least the surface of the plastic article. Thus, "incorporated" as used herein is intended to encompass compounding or blending the adhesion promoter into the polymer prior to forming the polymer into a desired article as well as impregnating at least the surface of a preformed polymeric article. Since the adhesion is latent until an oxidation treatment, the adhesion promoters can be employed in resin compositions without creating processing difficulties due to excessive sticking in the equipment, in contrast to many current adhesion and coating resin compositions. Actually, several of the preferred adhesion promoters behave as lubricants during processing, facilitating release of the hot plastic from steel equipment and molds. It has even been possible to incorporate a sufficient amount of the adhesion promoters into the surface of molded plastics by using them as mold release sprays.

The adhesion promoter can be contacted with the plastic plate by immersing the plate in a bath, e.g., a linseed oil bath, alternatively, this treatment of plate with adhesion promoter can be carried out when the printing plate is molded from its matrix. The matrix, for instance a phenolic resin coated and impregnated fiber board or a high temperature thermoplastic resin, e.g., polysulfone, is sprayed or painted with the linseed oil and then the polypropylene printing plate is molded from it as described in patent applicaton, Ser. No. 566,465 now abandoned, filed on July 20, 1966 by J. B. Wheeler, et al. The heat of the resin during the molding cycle effects the treatment without a separate treating step.

It has been found that impregnation or compounding of an adhesion promoter per se into a polymer without any special precautions usually does not improve adhesion because of adhesion failure between the exudate and the polymer. When, however, the excess exudate is removed from the polymer surface either by careful washing with a detergent or preferably with a solvent which is a good solvent for the adhesion promoter and a poor solvent for the polymer, then extremely high adhesions are possible on a completely reliable and reproducible basis. Also, in no case was a subsequent decrease in adhesion strength observed either after extensive thermal cycling or storage of the metal-plated samples for more than a year.

Since the latent adhesion promoters are all compounds which are very readily subject to auto-oxidation, it is often desirable and indeed sometimes essential to prevent premature oxidation by addition of suitable antioxidants. This is done whether the adhesion promoters are used as compounding ingredients or for impregnation of molded plates.

Oxidation of the resin compositions of the present invention can be accomplished through use of oxidizing techniques which readily oxidize the latent adhesion promoter to carboxyl containing radicals. Oxidizing solutions found suitable for use in the present invention are aqueous solutions of chromic acid in inorganic acids or aqueous solutions of chromic acid, both being at least about 85% saturated with respect to chromic acid at the particular use temperature of the oxidizing bath. For example, an oxidizing bath containing 29 parts chromium trioxide, 29 parts concentrated sulfuric acid and 42 parts of water has been found useful. Other oxidizing solutions and techniques, however, can similarly be employed such as flame treatment, corona discharge, glow discharge, ozonation, or exposure to actinic or high energy radiation and the like in a manner and duration sufficient to oxidize the latent adhesion promoter to carboxyl-containing radicals.

A conductive metal coating can be deposited on the oxidized polymer thereby permitting subsequent conventional electroplating techniques to be employed to obtain an electroplated polymeric substrate exhibiting peel strengths of up to 5.0 pounds per inch or more. A minimum of 5.0 pounds per inch is prefered although peel strengths of up to 40.0 pounds per inch or more have been obtained. The conductive metal coating can be deposited by immersing the oxidizing polymer in a solution of a reducing agent such as stannous chloride to sensitize said polymer. The sensitized polymer can then be immersed in a solution containing a salt of a noble metal such as platinum, palladium silver and gold and preferably in the form of a halide such as palladium chloride to activate said polymer. In lieu of the sensitizing and activating baths, other means can be employed to deposit an initial metal film in preparation for subsequent electroless metal deposition. For example, such films can be deposited by spray gun systems, gas plating, cathode sputtering, vacuum metallizing, decomposition of metal carbonyls and the like. Thereafter, the polymer can be immersed in an electroless plating solution such as those composed of a copper salt, a complexing agent to keep the copper in solution and a reducing agent to deposit a conductive metal film on said polymer. Finally, the resulting polymeric substrate having a conductive metallic film thereon can be electroplated by conventional techniques which generally comprise electrodepositing ductile copper, bright nickel and chromium to obtain an electroplated polymeric substrate exhibiting minimum peel strengths of at least about 5.0 pounds per inch.

The following examples are illustrative of the present invention and are not to be construed in limitation thereof. All percentages and parts are by weight unless otherwise stated.

EXAMPLE I

Two plates, compression molded from an ethylene-propylene block copolymer containing 5% copolymerized ethylene were trimmed and shaved to 12¾ in. x 9 in. x .065 in. These plates were then immersed in a linseed oil bath at 140° C. for 2 min. to prepare the polypropylene surface to accept the metal plating, followed by rinsing in diethylene glycol monoethyl ether acetate at room temperature. The plates were water rinsed, then flushed with a 0.25% water solution of sodium tetradecyl sulfate anionic detergent and rinsed again with water.

The treated surfaces were then etched in a bath containing:

| | Percent by weight |
|---|---|
| Chromium trioxide | 30 |
| Concentrated sulfuric acid | 30 |
| Water | 40 |

for four minutes at 80° C. with agitation and then water rinsed again. Activation of the surfaces was achieved by immersion in a solution containing:

| | Percent by weight |
|---|---|
| Palladium chloride | 0.018 |
| Hydrochloric acid | 0.017 |
| Water | 99.965 |

for five minutes at 50° C., followed by a thorough water rinse.

The plates were then plated with electroless nickel for 25 minutes at 80° C. to build up approximately 0.15 mil metallic nickel on the surfaces, followed by a final rinse for five minutes in water at 60° C. The composition of the electroless nickel bath was:

| | Percent by weight |
|---|---|
| Nickel chloride | 3 |
| Sodium hypophosphite | 1 |
| Sodium hydroxyacetate | 1 |
| Water | 95 |

having a pH of 4–6 and capable of depositing up to .5 mil per hour of semibright nickel. These plates were then suitable for use on a printing press. The plated nickel was firmly adhered and could not be dislodged by vigorous flexing. The flexibility of the plates was not impaired.

EXAMPLE II

A printing plate 6½ in. x 6¾ in. x .065 in. made from the same material as in Example I was coated with a conductive electroless nickel layer as in Example I and then strike electro-plated with a .4 mil layer of nickel from a nickel sulfamate bath.

The plate so coated was then electroplated with a 0.05 mil layer of metallic chromium in an electrolyte containing 33 oz./gal. chromium trioxide and .33 oz./gal. sulfate ($SO_4^=$) for 15 minutes at 45° C. The composite metal coating had excellent adhesion and strength and the plate was ready for use on a printing press.

EXAMPLE III

Four ethylene-propylene copolymer printing plates were made from unmounted zinc etchings by the following procedure. These engravings, measuring 23¾ in. x 15 in. x .065 in., comprised a matched four-color set for a Sunday comic subject. First a matrix was formed from each engraving, using a 24 in. x 16 in. x .080 in. blank sheet of thermoplastic polysulfone resin, having a glass-transition temperature of 190° C., a heat distortion temperature of 175° C. at 264 p.s.i. (ASTM Test No. D648–50) and a melt flow of 9 decigrams per minute at 350° C. (ASTM Test No. 1238–65T). Each engraving was laid on a sheet of insulating material, consisting of fiber glass and a thermosetting silicone resin, ⅛ in. thick (tradename Synthane Grade G–7), and having a compressive strength of 45,000 p.s.i. The matrix blank sheet was then placed over the engraving, and the thus formed sandwich heated under a 760° C. electrically heated quartz panel infra-red radiant heater two inches from the surface of the polysulfone. The temperature of the sheet was raised to 375° C. in one minute and 45 seconds. The heated sandwich was then placed in a hydraulic molding press, having a closing speed of 0.4 in. per second and a pressing speed of .04 in. per second with the top plates heated to 165° C. The press was closed with 275 tons force on the ram for a period of 30 seconds to mold and cool the matrix.

The molded matrix was trimmed to 23½ in. x 15½ in. and had a floor thickness in the image areas of .050 in.

On this matrix, was extruded a slab of the molten polypropylene copolymer 6 in. x 12 in. x ¾ in. at a temperature of 260° C. The matrix and slab of molten plastic was then placed in the molding press and the plate formed under 275 tons pressure and cooled for 60 seconds. The plate was removed from the press, trimmed to 14⅛ in. by 19⅞ in. and shaved to .065 in. thick in the image areas by a rotary cutter-type printing plate shaver. The plate was then curved to a radius of 6⅝ in. to fit the printing press by reheating it to 135° C. and cooling it between curved ⅛ in. thick aluminum sheets. The plate was mounted in a semi-circular plating rack, having a 6⅝ in. radius.

In this manner, each plate of the four-color set was prepared for the metal plating, which was carried out as in Example I to obtain an electroplated nickel coating on the printing surface whose thickness varied between 0.20 and 0.35 mil.

The plates were fastened to curved saddles by means of a two-sided pressure sensitive adhesive, having a thickness of .005 in. The total thickness of saddle adhesive and printing plate was 0.249 in. to fit the ¼ in. undercut of the printing press plate cylinder.

This set of plates was run on the rotary letterpress for 200,000 impressions in four colors. Clarity of the reproduction was superior to the chrome plated ¼ in. thick zinc engravings normally used. No sign of wear appeared in the prints. Registration and fitting of the colors to each other was accurate.

EXAMPLE IV

A four-color set for a Sunday comics subject is made as described in Example III, except that the adhesion promotor, in this case alkaline refined linseed oil, is applied to the face of the matrices by painting on a thin layer with a paint brush. The plates are then molded from the treated matrices as in Example III. Since the surface of the polypropylene is treated when molding the plates, the linseed oil treatment step is omitted from the plating procedure.

The plates are sensitized, plated with 0.1 mil electroless nickel, 0.4 mil of electroplated nickel, and 0.05 mil of electroplated chromium as in Example II.

These plates are mounted on 0.179 in. thick saddles by heating the plate and the saddle to 80° C. in an oven, forming the ends of the plates very exactly while hot to fit into slots provided for them in the ends of the saddles, and cooling to room temperature to shrink fit the plate under a tensile stress of approximately 20 lbs. per linear inch of plate width on to the saddles so they cannot move. The stress relaxation characteristics of the plastic plate are such that the residual stress under tension does not decay to less than 30% of original in 24 hours and less than 20% in four days. Thus, the plates are clamped on the saddle in a secure and fixed position throughout a press run of 2,000,000 impressions on a rotary letterpress printing machine by this residual tension. These plates do not fail from fatigue or distort under this mounting tension and show excellent clarity of reproduction and no significant amount of wear on the nickel-chromium clad surface.

What is claimed is:

1. A metal plated plastic printing plate comprising a plastic-printing plate having a metal coating thereon, said plastic having a tensile modulus of elasticity of from 50,000 p.s.i. to 250,000 p.s.i., as measured by ASTM Test D638-64T at 23° C. and said coating has at least two metal layers selected from the group consisting of nickel plated on nickel, nickel plated on copper, copper plated on copper, copper plated on nickel, chromium plated on nickel and chromium plated on copper.

2. The plated plate of claim 1 wherein the metal coating is from .01 to 1.0 mil thick.

3. The plated plate of claim 1 wherein the plastic is a polyolefin.

4. The plated plate of claim 1 wherein the plastic is polypropylene.

5. The plated plate of claim 1 having at least three metal layers wherein the base layer is selected from the group consisting of copper and nickel, the second layer is selected from the group consisting of copper, nickel and chromium and said third layer is selected from the group consisting of copper, nickel and chromium.

6. The plated plate of claim 1 having a base metal layer of electroless nickel, a second metal layer of plated nickel and a top metal layer of plated chromium.

References Cited

UNITED STATES PATENTS

| | | | |
|---|---|---|---|
| 3,150,939 | 9/1964 | Wenner | 29—195 |
| 3,360,349 | 12/1967 | Adomines | 29—195 |
| 3,377,259 | 4/1968 | Phillips | 29—195X |

L. DEWAYNE RUTLEDGE, Primary Examiner

E. L. WEISE, Assistant Examiner

U.S. Cl. X.R.

101—395; 117—71